United States Patent [19]

Torii

[11] Patent Number: 4,626,989
[45] Date of Patent: Dec. 2, 1986

[54] DATA PROCESSOR WITH PARALLEL-OPERATING OPERATION UNITS

[75] Inventor: Shunichi Torii, Musashino, Japan

[73] Assignee: Hitachi, Ltd., Tokyo, Japan

[21] Appl. No.: 520,769

[22] Filed: Aug. 5, 1983

[30] Foreign Application Priority Data

Aug. 16, 1982 [JP] Japan .............................. 57-141120

[51] Int. Cl.⁴ .............................................. G06F 9/30
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,559,183 | 1/1971 | Sussenguth | 364/200 |
| 4,156,905 | 5/1979 | Fassbender | 364/900 |
| 4,384,342 | 5/1983 | Imura et al. | 364/900 |

*Primary Examiner*—Thomas M. Heckler
*Attorney, Agent, or Firm*—Antonelli, Terry & Wands

[57] ABSTRACT

An information processor has a plurality of instruction execution units, and a circuit which distributes the decoded information of a currently decoded instruction to one of the instruction execution units on the basis of the decoded information of that instruction and the decoded information of a preceding instruction currently under the control of an instruction execution unit. The distribution circuit distributes the decoded information of the currently decoded instruction which conflicts with the preceding instruction to the instruction execution unit which is controlling the preceding instruction. Thus, the respective instruction execution units can execute the instructions quite independently of one another while guaranteeing a correct operational result, and enhancement in the processing capability conforming with the increase in the operation units can be expected.

7 Claims, 6 Drawing Figures

| | | | | | | | | | | | | | | | | |
|---|---|---|---|---|---|---|---|---|---|---|---|---|---|---|---|---|
| SA1 | 1 | 1 | 1 | 1 | 1 | 1 | 1 | 0 | 0 | 0 | 0 | 0 | 0 | 0 | 0 | 0 |
| SM1 | 1 | 1 | 1 | 0 | 0 | 0 | 0 | 1 | 1 | 1 | 0 | 0 | 0 | 0 | 0 | 0 |
| SA2 | 1 | 1 | 0 | 0 | 1 | 1 | 0 | 0 | 1 | 1 | 0 | 0 | 1 | 1 | 0 | 0 |
| SM2 | 1 | 0 | 1 | 0 | 1 | 0 | 1 | 0 | 1 | 0 | 1 | 0 | 1 | 0 | 1 | 0 |
| LINE 201 | 1 | 1 | 1 | 1 | 1 | 1 | 1 | 1 | 1 | 1 | 1 | 0 | 0 | 0 | 0 | 0 |
| LINE 202 | 1 | 1 | 1 | 0 | 1 | 0 | 1 | 0 | 1 | 1 | 0 | 1 | 1 | 1 | 1 | 0 |
| LINE 251 | 1/0 | 1 | 0 | 0 | 0 | 0 | 0 | 0 | 1 | 1 | 0 | 0 | 1 | 1 | 01/0 | |
| INPUT TO FF 283 | 1 | 1 | 1 | 1 | 1 | 1 | 1 | 1 | 1 | 0 | 0 | 1 | 1 | 0 | 0 | |
| INPUT TO FF 284 | 1 | 1 | 1 | 0 | 1 | 0 | 1 | 1 | 1 | 1 | 0 | 0 | 1 | 1 | 0 | 1 | 0 |

FIG. 6

DATA PROCESSOR WITH PARALLEL-OPERATING OPERATION UNITS

BACKGROUND OF THE INVENTION

The present invention relates to a computer which includes a plurality of operation units and which can execute a plurality of instructions in parallel.

A serial computer which serially executes one sequence of programs is typically formed of an instruction control unit and an operation unit. For the purpose of providing a computer which executes programs at a higher speed, it has been proposed to assemble a plurality of sets of the aforementioned units. However, such a computer does not properly operate in response to instruction sequence of the type indicated below:
Load—Register R1, R2 (R1←R2)
Add—Register R3, R1 (R3←R5+R1)
Subtract—Register R3, R0 (R3←R3−R0)
where R0, R1, R2 and R3 denote registers R0, R1, R2 and R3, respectively.

When a group of instructions whose executions are mutually interdependent are executed independently in parallel by a plurality of operation units, the final result (in this example, the content of R3) is not guaranteed. The reason is that the three instructions are executed quite independently, so that the operation result of a preceding instruction is not taken into consideration in the execution of a succeeding instruction. Such a condition is called an "operand conflict". In a prior-art computer, there is a single instruction control unit which performs the centralized control over operand conflicts in serial fashion, and the correct result is guaranteed even for an instruction sequence of the type mentioned above. More specifically, the start of the execution of the second instruction Add—Register is delayed until the executed result of the first instruction Load—Register has been obtained. The start of the execution of the third instruction Subtract—Register is delayed until the second instruction has read out the content of the R3 register and has written the executed result into the R3 register again. Also, in a prior-art computer which includes a plurality of pipeline operation units capable of operating simultaneously, there is only one instruction control unit, and only the decoding of a single instruction and the start of the operation unit corresponding to the single instruction are possible within one machine cycle. That is, the other operation units are idle during the cycle.

SUMMARY OF THE INVENTION

An object of the present invention is to provide an information processor which eliminates operand conflicts arising when a plurality of operation units are operated independently and which operates the plurality of operation units efficiently.

In order to accomplish the object, the information processor of the present invention comprises a plurality of instruction execution units, and a circuit which distributes the decoded information of a succeeding instruction to one of the instruction execution units on the basis of the sequentially decoded information of the succeeding instructions and the decoded information of preceding instructions which are under the control of the instruction execution units.

More concretely, the distribution circuit distributes the decoded information of the succeeding instruction which is in conflict with the preceding instruction to the instruction execution unit which is controlling the preceding instruction. Thus, the respective instruction execution units can execute the instructions quite independently of one another while guaranteeing a correct operation result, and enhancement in the processing capability conforming with an increase in the operation units can be expected.

DESCRIPTION OF THE PREFERRED EMBODIMENT

In an embodiment to be described below, it is assumed that operands are provided as the contents of a plurality of registers and that instructions are of three types: logical operation instructions, add/subtract instructions and multiply instructions.

Figure 1:
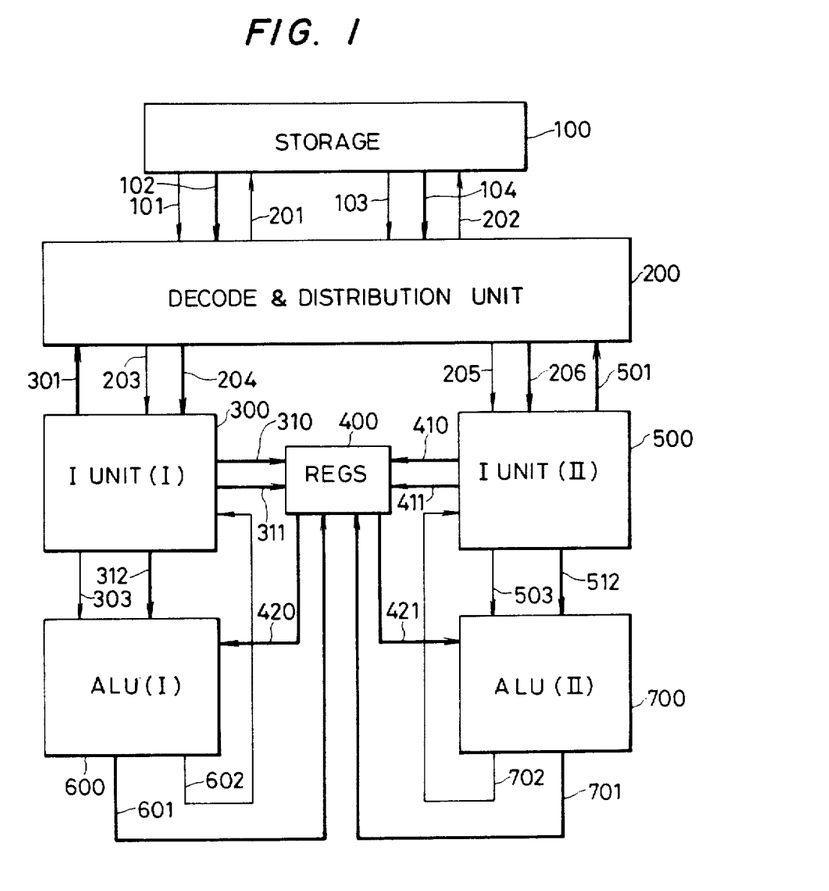
FIG. 1 is a general block diagram of a processor according to the present invention.

FIG. 1 shows the internal arrangement of a computer which is an embodiment of the present invention. A first arithmetic/logic unit (hereinbelow, called the "first ALU") 600 can execute add/subtract instructions and logical operation instructions. A second arithmetic/logic unit (hereinbelow, called the "second ALU") 700 can execute multiply instructions and logical operation instructions.

An instruction storage unit 100, a decode and distribution unit 200, and two pipeline-controlled instruction units (hereinbelow, called the "I units") 300 and 500 execute the various functions of reading out instruction words, decoding the types of instructions, reading out registers required for the execution of operations, starting the operation units, writing operated results from the operation units into the registers, and eliminating the operand conflict between the instructions, the elimination being closely connected with the present invention. As an external function, the embodiment is characterized in that the two operation units are controlled.

The two I units 300 and 500 receive the decoded results of instructions, one for each unit, every cycle and can respectively start the first ALU 600 and second ALU 700 independently of each other every cycle.

First, the outlines of the operations of the instruction storage unit 100 and the I units 300, 500 will be explained, whereupon the detailed arrangements and operations of the decode and distribution unit 200 and the I unit 300 will be stated.

The instruction storage unit 100 reads out two successive instructions to be subsequently decoded (the initial instruction is named the first instruction, and the subsequent instruction the second instruction), and it sends the contents of the first instruction and second instruction to the decode and distribution unit 200 via data lines 102 and 104, respectively. When the content of the first instruction has been properly sent (hereinbelow, termed "when the first instruction is valid"), a signal line 101 is rendered "1", and when the content has failed to be properly sent, the signal line is rendered "0". A signal line 103 is rendered "1" or "0" in accordance with the validity of the second instruction. When the combination of the values of the signal lines 101 and 103 has become "00", it is indicated that neither the first instruction nor the second instruction on the data lines is valid. When the combination has become "10", only the first instruction is valid. When the combination has become "01", only the second instruction is valid. When the combination has become "11", both the first instruction and the second instruction are valid. Only when the decode and distribution unit 200 receives the valid first instruction, and it has succeeded in decoding the first instruction and distributing it to the I unit 300 or 500 will it bring a signal 201 to "1" and request the next instruction. Similarly, only when the unit 200 has succeeded in the decoding of the second instruction, will it bring a signal line 202 to "1" and request the reading of the next instruction. In the next cycle, accordingly, the instruction storage unit tries to read out the subsequent instructions in correspondence with the instruction or instructions for which the decode and distribution have been successful.

More specifically, when both the valid instructions transmitted from the instruction storage unit have been successfully decoded and distributed, the instruction storage unit transmits up to two new valid instructions in the next cycle. When the valid instructions transmitted from the instruction storage unit includes at least one for which the decode and distribution have failed, the instruction storage unit transmits up to two valid instructions including the unsuccessful instruction or instructions, in the next cycle. In other words, the instruction for which the decode and distribution have failed is repeatedly transmitted by the instruction storage unit. When re-transmitted, the first instruction need not be sent as the first one again, but it may well be sent as the second one. Likewise, when re-transmitted, the second instruction need not be sent as the second one again. In the following embodiment, however, it is assumed that when the two valid instructions are transmitted, the first instruction must precede the second instruction.

The instruction storage unit which determines an instruction word to be fetched in the next cycle, in accordance with the progress of the decoding of the instruction has been realized by, e.g., HITAC-M200H. This system HITAC-M200H has the functions of fetching an instruction word 4 bytes ahead in the next cycle when an instruction having an instruction word length of 4 bytes has been successfully decoded, and fetching an instruction word 2 bytes ahead in the next cycle when an instruction having an instruction word length of 2 bytes has been successfully decoded.

When the decode and distribution unit 200 has succeeded in decoding the instruction to be executed by the first ALU 600, it puts an instruction unit I transmission signal on a signal line 203 to "1" and supplies a data line 204 with the decoded information of the instruction (concretely, the sort of an operation to be executed by the operation unit, the Nos. of registers from which inputs to the operation unit are read out, and the No. of a register into which an output from the operation unit is written).

When the value of the signal line 203 is rendered "1" by the instruction decode and distribution unit, the I unit 300 receives the decoded information of the instruction via the data line 204 and stores that information therein. Next, it appoints the read-out register Nos. via a data line 310 so as to read out the contents of the registers necessary for the operation among a group of registers 400, and it supplies the first ALU 600 via a data line 312 with the information of the sort of the operation to be executed (concretely, information indicating whether the operation is the addition or a logical operation). An add execution start signal on a signal line 303 is rendered "1" during only this cycle.

When the add execution has ended, the first ALU 600 puts an add execution end signal on a signal line 602 at value "1" and supplies the operation result to the group of registers 400 via a data line 601 so as to store the result in the group of registers 400. At this time, the first I unit 300 appoints the write-in register No. via a data line 311.

Signals worthy of note here are signals which indicate the "busy" condition of registers in the group of registers 400, and which are sent to the instruction decode and distribution unit via a group of signal lines 301. Upon receiving an instruction for updating a register i from the instruction decode and distribution unit, the first I unit puts the signal indicative of the busy condition of the register i to the value "1". When the register i has been updated by writing the result thereinto, the first I unit puts the signal to "0".

Further, even in a case where the preceding instruction updates a certain register j and where the succeeding instruction refers to the same register j, the first I unit can properly transmit the updated content of the register j.

Hereunder, there will be explained an example in which the group of registers 400 is composed of four registers (R0, R1, R2, R3). The group of signal lines 301 for indicating the busy condition of the respective registers is composed of four signal lines (signal lines 801-804 in FIGS. 4 and 6), which correspond to the busy statuses of the registers R0-R3.

Figure 2:
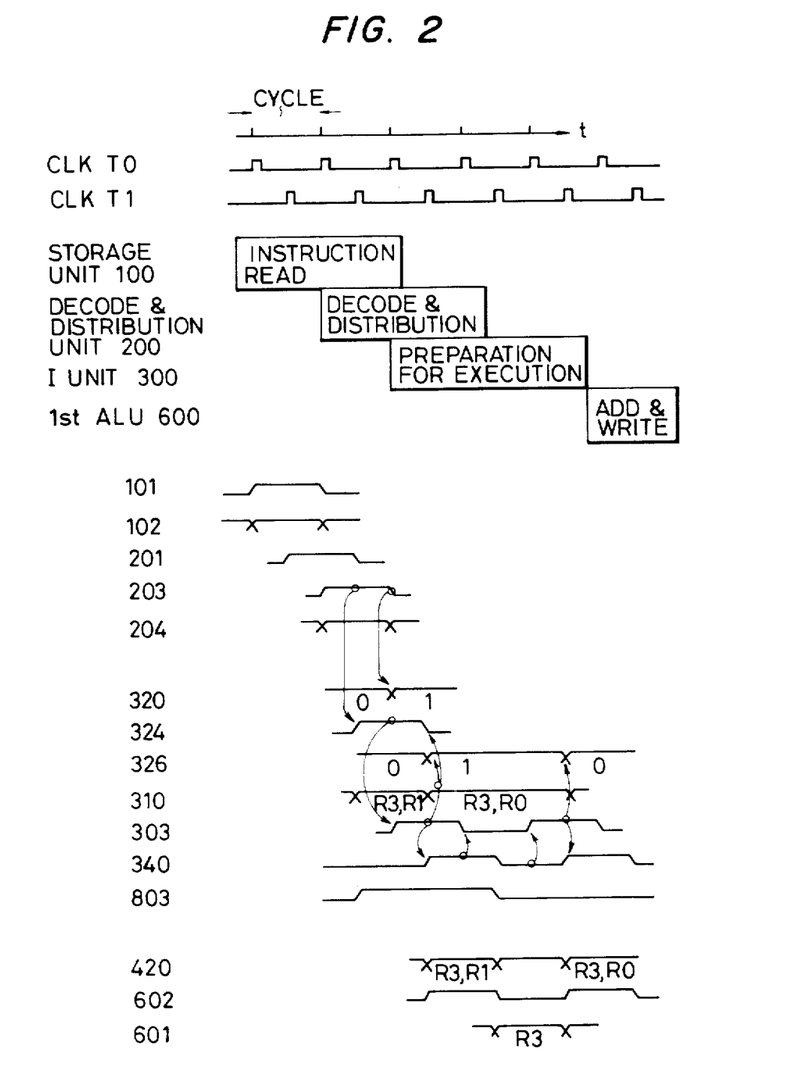
FIG. 2 is a time chart showing the operations of the processor shown in FIG. 1.

The upper half of FIG. 2 shows the situation in which the instruction storage unit, the decode and distribution unit, the first I unit and the first ALU perform pipeline operations at pitches of one cycle, and the time axis thereof is common to that of a time chart in the lower half. Clocks used are two-phase clocks T0 and T1 of one-cycle pitches.

The time chart of FIG. 2 illustrates the foregoing operations by taking as an example an add instruction (Add—Register R3, R1) for writing the added result of the contents of the registers R3 and R1 into the register R3. When the first instruction "valid" signal on the signal line 101 has become "1" in synchronism with the clock T0, the first instruction decode and distribution "successful" signal on the signal line 201 becomes "1" after about a half cycle in case of the successful decode and distribution: and after one cycle, since the signal line 101 has become "1", the first I unit will send a signal on the signal line 203 at level "1" in synchronism with the clock T0.

In case of a multiply instruction, the same operations are effected except for using the second I unit 500 instead of the first I unit 300 and using the second ALU 700 instead of the first ALU 600.

A signal line 205 bears a second I unit send signal, a data line 206 carries the decoded information of an instruction, a data line 410 carries signals for appointing read-out register Nos., a signal line 503 carries a multiply execution start signal, a data line 421 carries multiply input data from the registers, a data line 512 carries a signal for appointing the type of operation, a signal line 702 carries a multiply execution end signal, a data line 701 carries the executed operation result of the multiplication, a data line 411 carries a signal for appointing the No. of the write-in register, and a group of signal lines 501 carry the busy signals of the registers which exhibit a waiting condition for the writing of the multiply execution result.

Figure 3:
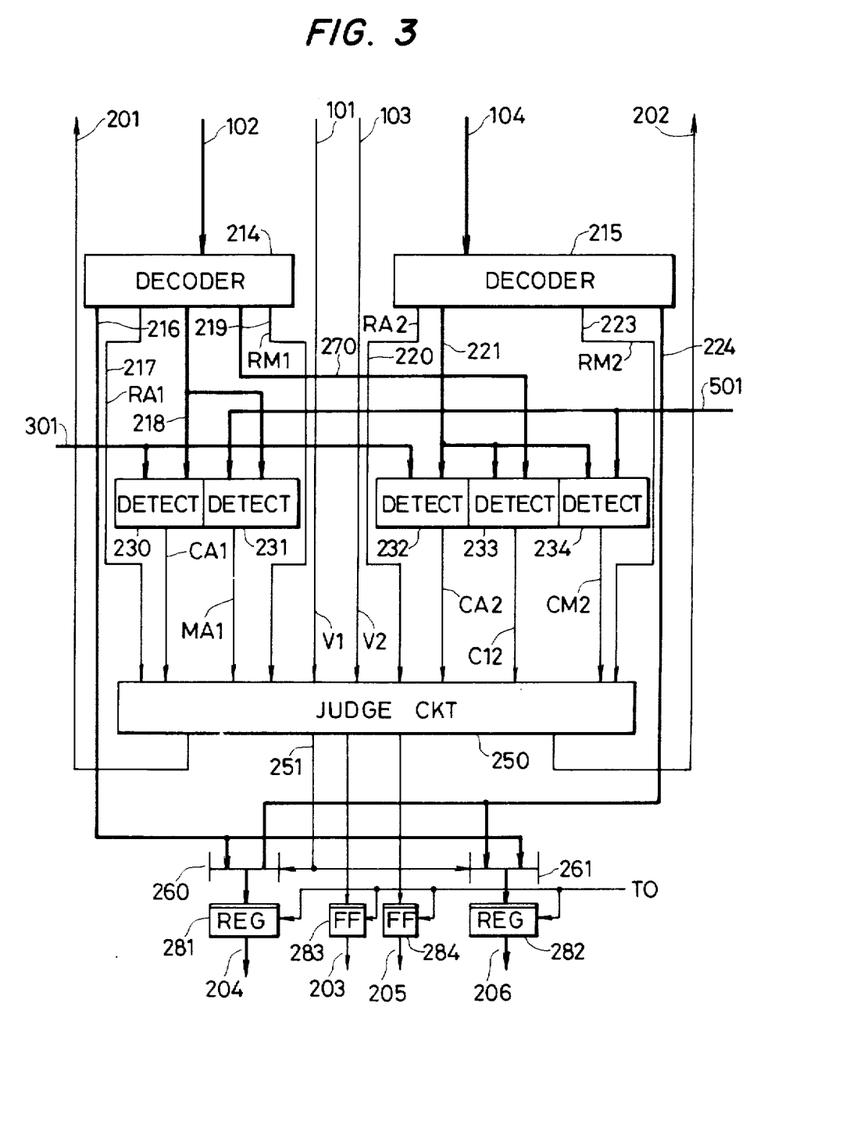
FIG. 3 is a diagram showing an example of the detailed arrangement of a decode and distribution unit in FIG. 1.

FIG. 3 is a diagram showing the details of the decode and distribution unit 200 in FIG. 2. Two instruction decoders 214 and 215 are respectively supplied with the contents of the first instruction and second instruction via the data lines 102 and 104. The respective instruction decoders 214 and 215 supply data lines 216 and 224 with the decoded information (mentioned above) of the first instruction and second instruction. In accordance with the direction of a distribution judge circuit 250, the decoded information is stored into a first I unit-oriented decoded information register 281 or a second I unit-oriented decoded information register 282 via a selector circuit 260 or 261 in synchronism with the clock T0. In the next cycle, the stored information is transmitted to the first I unit 300 or the second I unit 500 via the data line 204 or 205.

The output lines 217 and 220 of the instruction decoders 214 and 215 transmit signals which indicate that the first instruction or second instruction is the instruction of the sort to be executed by the first ALU, respectively. That is, they become "1" at the add instruction. The output lines 219 and 223 of the instruction decoders 214 and 215 transmit signals which indicate that the first instruction or second instruction is the instruction to be executed by the second ALU, respectively. That is, they become "1" at the multiply instruction.

When the first instruction is the logical operation instruction, both the signals 217 and 219 becomes "0", to indicate that the instruction is of the sort which can be executed by either the first ALU or the second ALU. When the second instruction is the logical operation instruction, both the signal lines 220 and 223 become "0".

The output signal lines 218 and 221 of the instruction decoders 214 and 215 indicate Nos. of registers which are fetched by the first instruction or second instruction, respectively. Concretely, the output signal line 218 is composed of four signal lines, which individually become "1" when the registers R0, R1, R2 and R3 need to be fetched and become "0" when they need not.

A detector 230 detects the operand conflict between the first instruction and the preceding instruction to be executed or being executed by the first ALU. That is, the detector decides if the first instruction reads out the content of a register which the preceding instruction is to alter or is altering.

Figure 4:
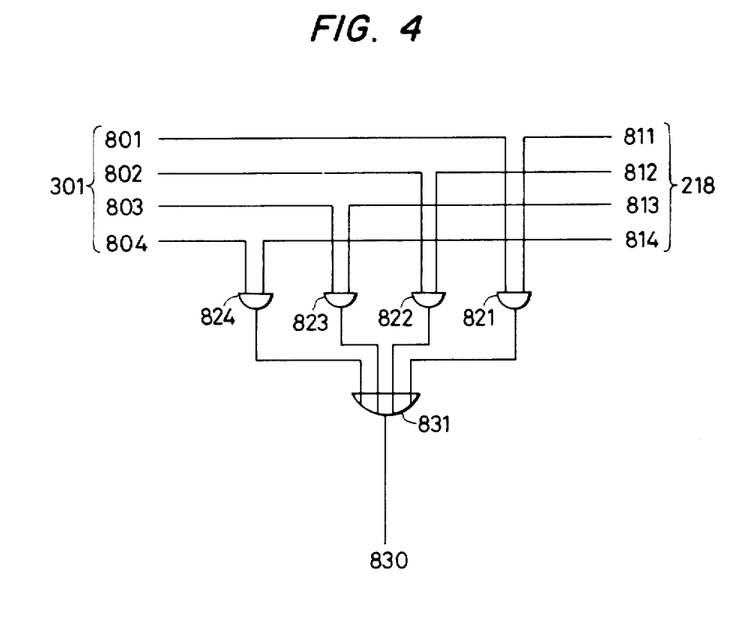
FIG. 4 is a diagram showing the details of an operand conflict detector circuit in FIG. 3.

FIG. 4 shows the details of the detector 230. The signal line 801 of the signal line group 301 indicates the "busy" condition of the register R0 (an instruction to alter R0 exists), and the subsequent signal lines 802, 803 and 804 indicate the busy of R1, R2 and R3, respectively. On the other hand, a signal line 811 in the signal line group 218 is a signal line which indicates that the first instruction reads out R0. The subsequent signal lines 812, 813 and 814 correspond to the read of R1, R2 and R3, respectively.

AND gates 821, 822, 823 and 824 detect operand conflicts on R0, R1, R2, and R3, respectively. Whenever the conflict of the registers exists between the first instruction and the preceding instruction to be executed by the first ALU (exactly, including the preceding instruction being executed), the output line 830 of an OR gate 831 becomes "1", and hence, the existence of the operand conflict can be detected. Detectors 231, 232, 233 and 234 in FIG. 3 have the same structure.

The detector 231 in FIG. 3 is a circuit which detects the operand conflict between the first instruction and the preceding instruction to be executed by the second ALU. The detector 232 or 234 detect the operand conflict between the second instruction and the preceding instruction to be executed by the first ALU or to be executed by the second ALU, respectively.

The output 270 of the instruction decoder 214 is a signal indicating No. of a register whose content is altered by the first instruction. It is composed of four signal lines, which indicate the alterations of R0, R1, R2 and R3 respectively.

The detector 233 detects if the content of the register which is altered by the first instruction is read out by the second instruction (the operand conflict between the first instruction and the second instruction).

The distribution judge circuit 250 is a circuit which decides if the first instruction and second instruction can be sent to the I units (the success of decode) by receiving the inputs on the operation units required by the first instruction and second instruction, the presence of the operand conflicts with the preceding instructions, and the presence of the conflict between the first instruction and second instruction.

The names and symbols of the input signals of the distribution judge circuit are listed below.

| Signal line 101: | Valid 1 | (V1) |
| --- | --- | --- |
| Signal line 103: | Valid 2 | (V2) |
| Signal line 217: | Request Add from 1 | (RA1) |
| Signal line 219: | Request Mult from 1 | (RM1) |
| Output of Detector 230: | Conflict between Add & 1 | (CA1) |
| Output of Detector 231: | Conflict between Mult & 1 | (MA1) |
| Signal line 220: | Request Mult from 2 | (RM2) |
| Output of Detector 232: | Conflict between Add & 2 | (CA2) |
| Output of Detector 234: | Conflict between Mult & 2 | (CM2) |
| Output of Detector 233: | Conflict between 1 & 2 | (C12) |

The first instruction may be sent to the first I unit coupled with the first ALU (Send 1 to Add, which is abbreviated to "SA1") when all the following conditions have held:
(a) Valid 1 = 1
(b) Request Multi from 1 = 0
(c) Conflict between Multi & 1 = 0

The condition (a) indicates that the first instruction is valid. The condition (b) indicates that the instruction is an operation of the sort which can be executed without resorting to the second ALU, namely, that it is an add instruction or a logical operation instruction. The condition (c) indicates that a register whose content is to be updated by the second I unit is not referred to, namely, that the instruction may be executed independently of the preceding instruction existing in the second I unit. Therefore, $$SA1 = V1 \cdot \overline{RM1} \cdot \overline{CM1}$$

The first instruction may be sent to the second I unit coupled with the second ALU (Send 1 to Multi, which is abbreviated to "SM1") when all the following conditions have held:

(a) Valid 1=1
(b) Request Add from 1=0
(c) Conflict between Add & 1=0
Therefore, $$SM1 = V1 \cdot RA1 \cdot CA1$$

The second instruction may be sent to the first I unit coupled with the first ALU (Send 2 to Add, which is abbreviated to "SA2") when all the following have held:
(a) Valid 2=1
(b) Request Multi from 2=0
(c) Conflict between Multi & 2=0
(d) Valid 1=0.OR.Conflict between 1 & 2=0
(e) Valid 1=0.OR.Send 1 to Add=1.OR.
Send 1 to Multi=1
Therefore, $$SA2 = V2 \cdot RM2 \cdot CM2 \cdot (V1 + C12) \cdot (V1 + SA1 + SM1)$$

(d) is a condition which indicates that no conflict exists between the first instruction and the second instruction. This condition (d) is required for the following reason. When the first instruction and second instruction are valid and have a conflict therebetween, the second instruction needs to be transmitted to the same I unit as that of the first instruction. In the embodiment shown in FIG. 3, however, only one instruction can be transmitted to the same I unit within the same cycle. (e) is a condition for inhibiting the decode of the second instruction when the decode of the valid first instruction has been unsuccessful. In the embodiment shown in FIG. 3, when both the first instruction and the second instruction are valid, the decode and distribution of only the second instruction are not executed. Otherwise, the instruction storage unit 100 will re-transmit, not only the first instruction, but also the second instruction, to the decode and distribution unit 200, with the result that the second instruction will be decoded and executed twice. This is prevented by the condition (e).

Conditions under which the second instruction may be sent to the second I unit coupled with the second ALU (Send 2 to Multi, which is abbreviated to "SM2") are similarly determined.

$$SM2 = V2 \cdot RA2 \cdot CA2 \cdot (V1 + C12) \cdot (V1 + SA1 + SM1)$$

Figure 5:
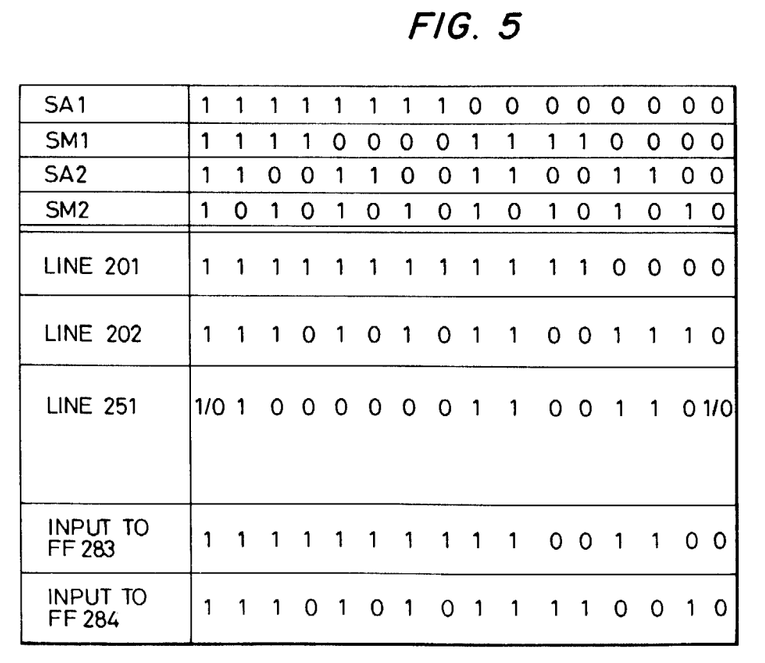
FIG. 5 is a diagram showing the operations of a distribution judge circuit in FIG. 5.

On the basis of the four conditions (SA1, SM1, SA2, SM2), signals are produced on the signal line 201 (indicating the success of the decode of the first instruction), the signal line 202 (indicating the success of the decode of the second instruction), an input signal to a FF 283 (a FF which indicates the transmission of the decoded information of an instruction to the first I unit coupled with the first ALU, an input signal to an FF 284 (an FF which indicates the transmission of the decoded information of an instruction to the second I unit coupled with the second ALU), and a signal line 251 for controlling the selector circuits 260 and 261. The flip-flops FF 283 and FF 284 store their input signals in synchronism with the clock T0. FIG. 5 illustrates an example of the signal generation, and indicates the output values of the six signals as to the 16 combinations of the 4 inputs. Rules for determining the output values are as follows:
(1) The first instruction is preferentially transmitted.
(2) When the first instruction can be transmitted to both the first and second I units, it is transmitted to the side to which the second instruction cannot be transmitted.

Referring to FIGS. 5 and 3, when the signal line 251 is at "0", the contents of the signal lines 216 and 224 are respectively supplied to the registers 281 and 282 by the selector circuits 260 and 261. Conversely, when it is at "1", they are respectively supplied to the registers 282 and 281. In the next cycle, the decoded information of the first instruction or the second instruction stored in the register 281 or 282 is transmitted to the first I unit or the second I unit via the signal line 204 or 206, respectively. Only when supplied with the correct decoded information will the flip-flop FF 283 or the FF 284 become "1", to transmit a signal to the first or second I unit via the respective signal line 203 or 205.

In FIG. 5, 0/1 indicates that either value of "0" or "1" may be used.

Now, FIG. 5 will be explained by taking as an example a case where {SA1, SM1, SA2, SM2} is (0, 1, 1, 1). In this case, in view of the significances of the SA1 et seq., it is possible to transmit the first instruction to only the second I unit for controlling the second ALU and to transmit the second instruction to both the first and second I units. Only one instruction can be transmitted to the same I unit at a time. Therefore, the distribution of transmitting the first instruction to the second I unit and transmitting the second instruction to the first I unit is most appropriate because in this way both the first and second instructions can be decoded and distributed. Accordingly, the decode and distribution of the first instruction are successful, and the signal line 201 is rendered "1" which indicates that the instruction decoder 214 can accept the next instruction in the next cycle. Likewise, the decode and distribution of the second instruction are successful, and the signal line 202 is rendered "1" which indicates that the decoder 214 can accept the next instruction in the next cycle. In order to supply the register 282 with the output 216 of the instruction decoder 214 for the first instruction and to supply the register 281 with the output 224 of the decoder 215 for the second instruction, the signal line 251 for controlling the selector circuits 260 and 261 is rendered "1". Both the inputs to the flip-flops FF 283 and FF 284 are rendered "1".

In the next place, there will be explained a case where {SA1, SM1, SA2, SM2} is (1, 0, 1, 0). In this case, both the first instruction and the second instruction are allowed to be transmitted to only the first I unit. In accordance with the rule of giving priority to the first instruction, only the first instruction is transmitted to the first I unit, and the second instruction can be transmitted to neither of the I units. Accordingly, the signal lines 201 and 202 become "1" and "0" respectively, to indicate the success of the decode and distribution of only the first instruction. The signal line 251 is rendered "0", to supply the register 281 with the output 216 of the instruction decoder 214 for the first instruction. The inputs of the flip-flops FF 283 and 284 are respectively rendered "1" and "0", to indicate that a decoded instruction is transmitted to only the first I unit in the next cycle.

When, in FIG. 5, {SA1, SM1, SA2, SM2} corresponds to any of the seven cases of (0110, 0111, 1001, 1011, 1101, 1110, and 1111), the decoded information of two instructions can be simultaneously transmitted to the two I units. In case of distributing the decoded information of instructions on the basis of FIG. 5, even when the two I units operate quite independently of each other, no malfunction attributed to the operand conflict occurs. Accordingly, the processor shown in FIG. 1 has the capability of simultaneously processing up to two instructions within one cycle.

Figure 6:
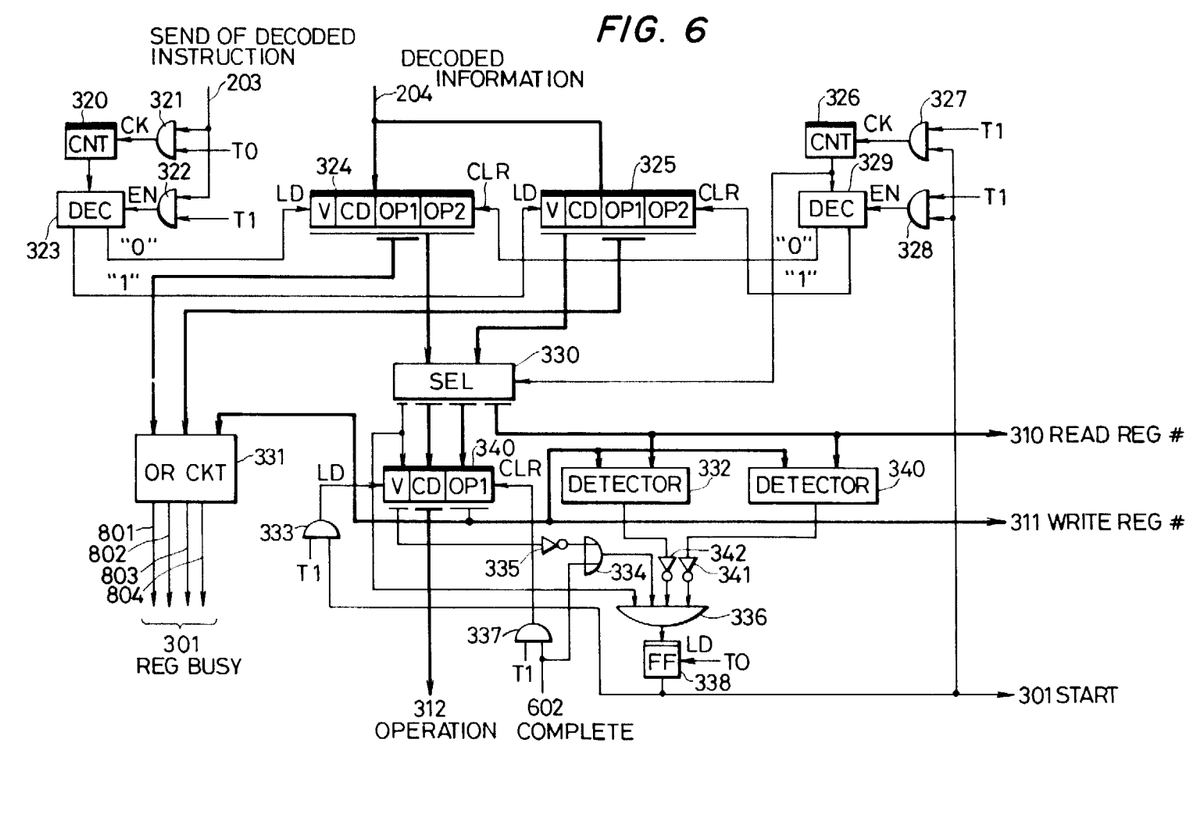
FIG. 6 is a diagram showing the details of an instruction unit in FIG. 1.

FIG. 6 shows the detailed arrangement of an embodiment of the I unit 300. The I unit 500 has quite the same arrangement. As the I units 300 and 500, known instruction control units which control the execution of instructions in the pipeline mode can be employed as they are. FIG. 6 shows only those parts required for understanding the present invention. In the I unit of FIG. 6, up to two decoded instructions can be stored in a stack which consists of first and second waiting instruction registers 324 and 325, and one instruction under execution can be stored in an executive instruction register 340.

A counter 320 is a counter for the in-pointer of the waiting instruction stack. Since the output of an AND gate 321 is connected to the CK input pin of the counter 320, the content of this counter is counted up in synchronism with the clock T0 when the decoded instruction transmission signal line 203 is at "1".

A counter 326 is a counter for the out-pointer of the stack. Owing to an AND gate 327, the content of this counter 326 is counted up in synchronism with the clock T1 when the operation start indication signal line 301 is at "1".

The LD pin of each register or flip-flop in FIG. 6 is a pin for an input directive for the loading of data, while the CLR pin thereof is a pin for an input directive for the clearing of the content thereof. The direction of the LD pin is preferred over the direction of the CLR pin.

When the decoded instruction information has been transmitted from the instruction decode and distribution unit via the data line 204, the decoded instruction transmission signal of the signal line 203 is "1". This signal is fed through an AND gate 322 and a decoder 323, the LD (load) pin input of the waiting instruction register directed by the in-pointer counter 320 becomes "1" (the register 324 is directed when the value of the counter is "0", and the register 325 when "1"), and the content of the data line 204 is entirely stored in the directed register. This content is composed of four parts. The leftmost part V is a valid bit which indicates the existence of a decoded instruction. The next part CD composed of 3 bits is code bits indicating the sort of an operation.

| | |
|---|---|
| $000_2$: | Subtract |
| $001_2$: | Add |
| $010_2$: | Multiply |
| $100_2$: | AND logical operation |
| $101_2$: | OR logical operation |
| $110_2$: | EOR logical operation |
| $111_2$: | Provide input as it is. |

(Logical operations: $100_2$–$111_2$)

The next part OP1 composed of 4 bits is a part for appointing No. of the register into which the operated result is written.

| | |
|---|---|
| $0000_2$: | The result is not written into the register. |
| $1000_2$: | The result is written into R0. |
| $0100_2$: | The result is written into R1. |
| $0010_2$: | The result is written into R2. |
| $0001_2$: | The result is written into R3. |

That is, the successive bits reckoned from the most significant bit correspond to R0, R1 and R2, and the least significant bit corresponds to R3. The last part OP2 composed of 8 bits is a part for appointing Nos. of registers whose contents become the inputs of the operation. Each of an operation units 600 and 700 executes the operation by receiving the contents of two registers. Accordingly, the more significant 4 bits appoint the No. of the register whose content becomes one input of the operation unit, in correspondence similar to that of the part OP1, while the less significant 4 bits appoint the No. of the register whose content becomes the other input of the operation unit.

Referring now to FIGS. 2 and 6, the operations of the I unit 300 will be described by taking as an example the add instruction (Add—Register R3, R1) indicated in the time chart of FIG. 2.

When the add instruction has been transmitted to the I unit 300, the decoded instruction information on the data line 204 is stored in the first waiting instruction register 324, subject to the in-pointer counter 320 being of "0".

Subject to the out-pointer counter 326 being "0", a selector 330 which receives the output of the counter 326 as its control input selects the content of the register 324 as its output. The 8 bits of the part OP2 outputted from the selector circuit 330 are sent via the data line 310 to the group of registers 400 as two read register No. appointing signals. The group of registers 400 in FIG. 1 supplies the first ALU with the contents of the two appointed registers via the data line 420.

The executive instruction register 340 stores the decoded information of a preceding instruction which is being executed presently. The ability to start the execution of the add instruction needs to be determined by checking the executed status of the preceding instruction. All the following five conditions must hold at the start of the execution:

(a) A valid decoded instruction exists in the waiting instruction register. (In the above example, the add instruction has reached the waiting instruction register.)

(b) The first ALU is not executing another instruction, or it ends the execution of an instruction being executed in the next cycle.

(c) The register R3 whose content is used as one input in the add instruction is not scheduled to be updated by the preceding instruction.

(d) The register R1 whose content is used as the other input in the add instruction is not scheduled to be updated by the preceding instruction.

The condition (a) is indicated by the part V of the output of the selector circuit. Whether or not the first ALU is executing another instruction, is indicated by the inverted signal of the part V of the executive instruction register 340, namely, the output signal of an inverter circuit 335. Whether or not the execution ends in the next cycle, is indicated by an add execution "complete" signal on a signal line 602. Accordingly, the output of an OR gate 334 responsive to both of these signals indicates the condition (b). The condition (c) is indicated by a signal obtained in such a way that the output of a conflict detector circuit 332, which receives the more significant 4 bits of the 8 bits of the part OP2 of the selector circuit 330 and the part OP1 of the executive instruction register 340, is inverted by an inverter circuit 342. The condition (d) is indicated by the output signal of an inverter circuit 341 supplied with the output of a conflict detector circuit 340' which receives the less significant 4 bits of the 8 bits of the part OP2 of the selector circuit 330 and the 4 bits of the executive instruction register 340. The detector circuit 332 or 340' has the same structure as that of the detector circuit shown in FIG. 4. The logic AND of the above four conditions (a)-(d) is taken by an AND gate 336, the output of which becomes the input of a flip-flop 338 indicative of the start of the add execution synchronized with the clock T0.

The time chart of FIG. 2 depicts a case where no instruction precedes the add instruction. A half cycle after the instruction decode and distribution signal 203 for the first I unit has become "1", the decoded instruction information is stored in the first waiting instruction register 324. From this time on, the busy signal 803 for the register R3 into which the add instruction writes the result becomes "1". By receiving the contents of the parts OP1 of the waiting instruction registers 324 and 325 and the part OP1 of the executive instruction register 340, a group of OR circuits 331 take the ORs of the corresponding signals of the respective registers so as to prepare the group of busy signals 301 of the registers. For example, the signal 803 is prepared by the logic OR of the three signals corresponding to the register R3. It is assumed in FIG. 2 that the out-pointer counter 326 is "0" and that the add instruction has no conflict with the preceding instruction. Therefore, a half cycle after the decoded information has been stored in the waiting instruction register 324, the add execution start indicating flip-flop 338 becomes "1" in synchronism with the clock T0. After a further half cycle, the out-pointer counter 326 has its content updated in synchronism with the clock T1 by the AND gate 327 in FIG. 6, to be counted up from "0" to "1". Simultaneously, the waiting instruction register 324 indicated by the content of the counter 326 before being updated is cleared by an AND gate 328 and a decoder 329 in FIG. 6. At the same time as the clear, the output of the selector circuit 330 (namely, the content of the first waiting instruction register 324 before being cleared) is stored in the executive instruction register 340 in synchronism with the clock T1 by an AND gate 333 in FIG. 6. However, the content of the part OP2 is not stored because it is not used thereafter. As illustrated in FIG. 6, the part V of the executive instruction register 340 is used for preparing the input signal of the add execution start indicating flip-flop 338 as described before. The content of the part CD is sent via the data line 312 as the signal which indicates the type of operation, for the first ALU 600. The content of the part OP1 is sent via the data line 311 as the signal which indicates the No. of the write register, for the group of registers 400, and it is simultaneously inputted to the detectors 332, 340' and the group of OR circuits 331 as described before.

It is assumed in the time chart of FIG. 2 that the execution of the add instruction is completed in one cycle. Therefore, a half cycle after the add execution start signal 303 has become "1", the first ALU 600 brings the add execution completion signal 602 to "1". At this time, the execution instruction register 340 is cleared in synchronism with the clock T1 by an AND gate 337.

In the latter half of the time chart of FIG. 2, there is illustrated only the operation of the part of the start of the execution of the succeeding subtract instruction (Subtract—Register R3, R0). The inputs of the subtract instruction are the contents of the registers R3 and R0. On account of the operand conflict, the start of the execution of the subtract instruction needs to wait until the add instruction stores its result in the register R3. One cycle is required for the execution of the add instruction, and two cycles are required for reading the register R3, the add operation and the write operation in total. The time chart of FIG. 2 illustrates the time relationship wherein one cycle after the add input data of the add instruction has been delivered to the data line 420, the data of the added result is delivered to the data line 601, and it is further delivered to the data line 420 as addition input data for the subtract instruction from the group of registers 400 in the next cycle. Accordingly, the execution start signal of the succeeding subtract instruction needs a control under which it becomes "1" after two cycles with respect to the preceding add instruction. This control is realized in such a way that, in the cycle in which the preceding add instruction exists in the instruction executing register 340, the operand conflict thereof with the succeeding subtract instruction is detected by the detector 332, to inhibit the output of the AND gate 336 from becoming "1". In the absence of the conflict, the subtract instruction has its execution started immediately in response to the clock T0 produced after the completion of the execution of the addition. Accordingly, the subtraction is executed in parallel with the write of the added result. This is the same as in the conventional pipeline control.

While, in the above embodiment, the operand conflict detector circuit for exactly determining the presence of a conflict is provided for each register, it is possible to make the detectibility less accurate and detect a conflict for, e.g., two registers collectively. In this case, however, even when no conflict arises, the presence of a conflict might be detected in excess, and instructions which can be executed by two operation units in parallel might be serially distributed to the identical operation unit, to degrade the performance. As a merit in this case, the number of the conflict detector circuits may be smaller.

Needless to say, such modifications are also covered within the scope of the present invention.

While the embodiment has illustrated only the operand conflict concerning the operand update of the preceding instruction and the operand refer of the succeeding instruction, quite similar circuits can be used for solving the operand conflict between the operand refer of the preceding instruction and the operand update of the succeeding instruction and the operand conflict between the operand update of the preceding instruction and the operand update of the succeeding instruction.

While, in the above embodiment, only the conflict between the operands of registers has been exemplified as the operand conflict, the invention can be similarly performed for the conflict between operands in memories.

In addition, the operand conflict includes an example stated below. This corresponds to a case where an address required by the succeeding instruction is changed by the operated result of the preceding instruction. For example, in a case where the address of an operand in a memory as required by the succeeding instruction is determined by data in a group of registers; when the data is changed by the operation of the preceding instruction, an address computation for the succeeding instruction cannot be started until the operation of the preceding instruction ends. The present invention is also applicable to the case of such operand conflict.

As set forth above, according to the present invention, while instructions are being executed in parallel by a plurality of instruction control units, a consistent result can be obtained.

What is claimed is:

1. An information processor for processing a sequence of instructions comprising:
   decode means for sequentially decoding the instructions of said sequence;
   a plurality of control means for controlling execution of the decoded instructions received from said decode means;
   a plurality of operation means, each connected to a respective one of said control means, for executing an instruction under control of the control means connected thereto; and
   distribution means connected to said decode means and said plurality of control means for distributing a currently decoded instruction to one of said control means selected on the basis of comparison of said currently decoded instruction delivered from said decode means and at least one preceding decoded instruction whose execution is presently under the control of one of said plurality of control means.

2. An information processor according to claim 1, wherein said distribution means comprises means for detecting a conflict between said currently decoded instruction and one of a plurality of preceding decoded instructions on the basis of comparison of said currently decoded instruction and said one of said preceding decoded instructions, and means for distributing the currently decoded instruction to the control means controlling the execution of said one of said preceding decoded instructions when a conflict has been detected.

3. An information processor according to claim 1, wherein said decode means comprises means for simultaneously decoding a predetermined number of instructions; and wherein said distribution means comprises means for distributing decoded instructions to respective ones of said plurality of control means selected on the basis of comparison of the respective decoded instructions simultaneously decoded by said decode means and of at least one of a plurality of preceding instructions presently being executed by said operation means.

4. An information processor according to claim 3, wherein said distribution means comprises:
   first means for comparing each of the instructions simultaneously decoded with at least one preceding decoded instruction; and
   second means for comparing the decoded instructions simultaneously decoded with each other; and
   means distributing the respective simultaneously-decoded instructions to respective ones of said plurality of control means on the basis of outputs of said first and second means.

5. An information processor according to claim 4, wherein said first and second means are respectively means for detecting conflicts between the instructions to be compared.

6. An information processor according to claim 1, wherein each of said control means comprises:
   means for holding the plurality of decoded instructions distributed sequentially by said distribution means;
   execution control means for for controlling execution of processes corresponding to a decoded instruction, on the basis of a respective decoded instruction held by said holding means; and
   third means for detecting conflicts between the instruction under execution and instructions held in said holding means on the basis of comparison of said instruction under execution and said instructions held in said holding means; and wherein said execution control means comprises:
   means for preventing the execution of said instructions held in said holding means from being started when a conflict has been detected by said third means.

7. An information processor according to claim 6, wherein said execution control means comprises means for controlling the executions of said instructions in a pipeline mode when the conflict has not been detected, so as to start a process of one of said instructions held in said holding means in an overlapping manner with a process of said instruction under execution.

* * * * *